United States Patent [19]

Dunfield

[11] Patent Number: 5,841,252
[45] Date of Patent: *Nov. 24, 1998

[54] DETECTION OF STARTING MOTOR POSITION IN A BRUSHLESS DC MOTOR

[75] Inventor: John C. Dunfield, Santa Cruz, Calif.

[73] Assignee: Seagate Technology, Inc., Scotts Valley, Calif.

[*] Notice: The term of this patent shall not extend beyond the expiration date of Pat. No. 5,569,990.

[21] Appl. No.: 414,312

[22] Filed: Mar. 31, 1995

[51] Int. Cl.$^6$ ........................................ H02P 7/00
[52] U.S. Cl. ........................... 318/254; 318/439
[58] Field of Search .................. 318/254, 439, 318/138, 696, 433; 363/71, 41

[56] References Cited

U.S. PATENT DOCUMENTS

| | | | |
|---|---|---|---|
| Re. 31,229 | 5/1983 | King | 318/696 |
| 3,909,688 | 9/1975 | Blaschke et al. | 318/227 |
| 4,074,179 | 2/1978 | Kuo et al. | 318/696 |
| 4,136,308 | 1/1979 | King | 318/696 |
| 4,138,308 | 2/1979 | Guenther | 156/433 |
| 4,520,302 | 5/1985 | Hill et al. | 318/696 |
| 4,641,066 | 2/1987 | Nagata et al. | 318/254 |
| 4,673,849 | 6/1987 | Sears et al. | 318/272 |
| 4,678,973 | 7/1987 | Elliott et al. | 318/254 |
| 4,746,850 | 5/1988 | Abbondanti | 318/723 |
| 4,752,724 | 6/1988 | Radziwill et al. | 318/254 |
| 4,772,839 | 9/1988 | MacMinn et al. | 318/696 |
| 4,777,419 | 10/1988 | Obradovic . | |
| 4,858,044 | 8/1989 | Crapo | 360/99.08 |
| 4,876,491 | 10/1989 | Squires et al. | 318/138 |
| 4,879,498 | 11/1989 | Shinohara et al. | 318/254 |
| 4,988,939 | 1/1991 | Reichard et al. | 318/800 |
| 4,992,710 | 2/1991 | Cassat | 318/254 |
| 5,001,405 | 3/1991 | Cassat | 318/254 |
| 5,028,852 | 7/1991 | Dunfield | 318/254 |
| 5,117,165 | 5/1992 | Cassat et al. | 318/254 |
| 5,245,256 | 9/1993 | Cassat et al. | 318/254 |
| 5,253,155 | 10/1993 | Yamamoto | 363/71 |
| 5,254,914 | 10/1993 | Dunfield et al. | 318/254 |

OTHER PUBLICATIONS

"Detection of Rotor Position in Stepping and Switched Motors by Monitoring of Current Waveforms", IEEE Transactions on Industrial Electronics, vol. IE–32, No. 3, Aug. 1985.

"Motor Drive Schemes", Brushless Permanent–Magnet Motor Design, Chapter 7, Duane C. Hanselman, pp. 155–181.

*Primary Examiner*—John W. Cabeca
*Attorney, Agent, or Firm*—LaRiviere, Grubman & Payne

[57] ABSTRACT

A microprocessor-controlled-circuit applies pulses to a standing motor whose rotor position is to be determined. The time required for the injected current to reach a predetermined threshold in a comparator is measured. The pulses are long enough to effectuate an accurate measurement, but not so long that the rotor moves. The pulse is applied twice to each phase, once with a positive polarity and once with a negative polarity, for a total of six measurements. The positive and negative rise times are subtracted from each other to determine whether the positive or negative current rise time was greater. Based upon the differences in the readings for all of the phases, the position of the rotor is known. There are differences in which the difference is zero or negligible. There are at least two methods to determine rotor position when there are ambiguities in the sign of the difference. In one method, the combination of the sign of the rise time difference or its absence plus the magnitude of the rise time can be used along with look-up tables to determine the rotor position. Another method is to resolve a position uncertainty by changing the effective rotor position. This is done by pulsing all three phases actively. Instead of leaving a phase open during pulsing, the third phase is tied high or is tied low. Once start-up ambiguities are resolved, control of acceleration from stand-still through medium speed to constant, nominal speed is provided.

14 Claims, 12 Drawing Sheets

DETECTION OF STARTING MOTOR POSITION IN A BRUSHLESS DC MOTOR

CROSS-REFERENCES TO RELATED APPLICATIONS

Applicant hereby makes reference to patent application Ser. No. 414,289, filed Mar. 31, 1995, now U.S. Pat. No. 5,569,990, issued Oct. 29, 1996 for "Detection of Starting Motor Position In A Brushless DC Motor."

TECHNICAL FIELD

The present invention relates to starting and controlling brushless DC motors. More particularly, this invention relates to measuring and resolving ambiguities in the starting rotor position of brushless DC motors without using Hall-effect sensors or the like, then starting and accelerating such a motor from stand-still through medium speed to a desired speed.

BACKGROUND ART

In electronically commutated DC motors, it is necessary to determine the rotor position in order to insure a correct commutation. This is particularly difficult when the motor is at rest because there is no motion-induced back emf (electromotive force) to provide an indication of the commutation points. Without such information, such a motor at rest may start up in the reverse direction. In certain applications of this type of motor, starting in the reverse direction can be very undesirable. One example of such an application is use of the motor as a spindle drive motor in a hard disk drive. It will be understood, however, that this type of motor is not limited to use in a hard disk drive.

Heretofore, many techniques have been used to determine the starting rotor position of brushless DC motors. For example, U.S. Pat. No. 3,909,688 to Blaschke et al., discloses that before starting a motor, a voltage step is applied to the excitation winding of the motor with the stator windings turned off. The voltage step is also applied to a simulation circuit that simulates the motor. A signal representing an assumed rotor angle stored in a counter is also applied to the simulation circuit. A measurement is made of the voltage induced in the stator that is indicative of the angular position of the stator voltage vector. A measurement is made of the voltage produced by the simulation circuit that is indicative of the simulated stator voltage vector. The angular difference between the measured angular position of the stator voltage vector and the measured angular position of the simulated stator voltage vector is determined. The count of the counter is changed until the difference between the measured angular position and the angular position of the simulated stator voltage vector agree. If the assumed rotor angle as represented by the count in the counter is incorrect, an angular difference will be computed. This angular difference is used to correct the counter to bring the angle stored therein into agreement with the actual angle. When that occurs, the initial rotor angle is known, and the motor is then ready for starting.

Other techniques that have been used for determining rotor position include use of an absolute position sensor, such as an absolute encoder or resolver, and Hall-effect sensors. However, all of the foregoing prior art techniques have disadvantages relating to measurement reliability and precision, size and cost, especially in small motor packages such as those found in hard disk drives, for example.

Since there are so many disadvantages involved in using position sensors such as Hall-effect sensors, many different solutions to indirect position detection not requiring sensors have been developed. In particular, U.S. Pat. Nos. 5,001,405 and 4,992,710, both of which are assigned to the assignee hereof, describe techniques for determining rotor position at start without using encoders, resolvers or Hall-effect sensors. Current pulses are injected into different motor phases, taken alone or in a combination of two phases. Each phase or pair of phases is energized by two pulses of opposite polarity. The sign of the difference between the individual voltages is detected and each induced voltage is measured after a predetermined time, T. After a succession of these tests are performed, a table of results is provided for determining the position of the rotor with respect to the motor phases. Thus, the correct polarity for reliably starting the motor in the proper direction is determined.

Once rotor starting position is reliably and accurately determined in such motors, rotor torque is produced by sequentially applying current to the stator or field windings. In U.S. Pat. No. 5,117,165, assigned to the assignee hereof, torque in the rotor is developed by applying long duration current pulses to a combination of motor phases based on rotor position. The duration of the pulses produce sustained torque. The alternating sequences of determining instantaneous rotor position and applying long duration current pulses to selected phases continues until the motor has reached medium speed. Once the rotor begins to turn, the back emf induced in the windings thereby may be measured to detect the commutation points and control its rotational speed. In U.S. Pat. No. 5,245,256, also assigned to the assignee hereof, a system for rotor speed control without the use of conventional rotor position location devices is described. The speed of the motor is determined using the back emf zero-crossings, measured only on complete rotor revolutions. The desired nominal speed is monitored by comparing the measured speed with the desired speed, and adjusting motor current accordingly.

The present inventor, John C. Dunfield, holds U.S. Pat. Nos. 5,028,852 and 5,254,914, also assigned to the assignee of the present invention. The '852 patent teaches using a time differential method to measure motor position. Current pulses are injected into different motor phases, taken alone or in a combination of two phases. Each phase or pair of phases is energized by two pulses of opposite polarity. The time that it takes each of the current pulses to reach a predetermined threshold level is measured. The times are compared in a comparator. If the negative current takes the longer time to reach the predetermined threshold level, then the result is indicated as a negative sign. Conversely, if the positive current takes the longer time to reach the predetermined threshold level, then the result is indicated as a positive sign. After a succession of these test is performed, a table of results is provided for determining the position of the rotor with respect to the motor phases. Thus, the correct polarity for reliably starting the motor in the proper direction is determined.

The '914 patent is similar to the '852 patent, except that it measures the induced voltage in a non-energized winding. Thus, rotor position is detected by using a mutual inductance method. The present invention is an extension of inventions disclosed in both of the '852 and '914 patents.

DISCLOSURE OF INVENTION

For measuring the starting rotor position of a brushless DC motor according to the present invention, there is provided a microprocessor-controlled-circuit for applying short pulses to a motor whose rotor position is to be determined. The motor winding is of the Y or star configuration, and the pulse is applied by an driver circuit through two of the windings or phases while the motor is stationary and otherwise turned off.

Sequentially, measurements are made on each of the three sets of phases: A-B, B-C, and A-C. The pulse is applied twice to each phase, once with a positive polarity and once with a negative polarity. As described in U.S. Pat. No. 5,028,852, and in U.S. Pat. No. 5,254,914, the purpose is to measure the inductance of the windings by measuring the rise time of the current injected into the windings. The inductance is a function of the rotor position. The positive and negative rise times are subtracted from each other to determine whether the positive or negative polarity current rise time was greater. Based upon the differences in the readings for all of the phases, the rotor position of the motor is known. For example, if $\Delta t1$ is negative (or a binary zero), $\Delta t2$ is positive (or a binary one), and $\Delta t3$ is positive (or a binary one), then the rotor position in electrical degrees is 60±30 degrees. However, there are positions in which the measurement of rise times or the difference between the measured rise times is ambiguous, or so negligible as to be ambiguous.

In accordance with the principles of the present invention, there are at least two methods to resolve the ambiguities in the rise time measurements and the difference and the sign of the difference between the measured rise times by extension of the teachings in U.S. Pat. No. 5,028,852 and in U.S. Pat. No. 5,254,914.

Method 1: The location of small difference in rise time, i.e., $\Delta t3<X$ is accompanied by a large magnitude (i.e., unsaturated inductance) time to threshold. Therefore, if $\Delta tn<X$, then check that $tn+$ or $tn-$ has a large value>Y. If these conditions are met, then the location is at a particular position (i.e., 30 degrees electrical) has been confirmed, rather than an anomaly or noise condition, and the optimum phase condition can be commanded, i.e., "110". Therefore, the combination of the sign of the rise time difference or its absence plus the magnitude of a rise time can be used to further qualify the position to determine the position and the appropriate phase condition for starting. The use of the magnitude of the sign difference plus magnitude of the rise time can also be used to quantify position within several degrees. Thus, optimum starting initial position phase or command, plus subsequent "open" loop timing phase advances are possible until zero back emf crossings are reliably detected.

Method 2: Another way to quantify position is to resolve a position uncertainty by changing the effective rotor position. This can be done by pulsing all three phases actively. Instead of leaving a phase open during pulsing, it can either be tied high or tied low. When the third lead has been tied high or low, it has been found that, with a given motor, there is an approximate 7.5 degree electrical shift in the small rise time difference condition. Therefore, ambiguities in sign of difference $\Delta X$ can be resolved by retest with the extra lead tied either high or low. Mapping of the motor position in this way precisely defines the starting position to within several electrical degrees.

Once rotor starting position is reliably and accurately determined in such motors, rotor torque is produced by sequentially applying long duration current pulses to the stator or field windings. The duration of the pulses produce sustained torque. The alternating sequences of determining instantaneous rotor position and applying long duration current pulses to selected phases continues until the motor has reached medium speed.

Once the rotor begins to turn, the back emf induced in the windings is measured to detect the instantaneous rotor position and control its rotational speed. The speed of the motor is determined using the back emf zero-crossings, measured only on complete rotor revolutions. The desired speed is monitored by comparing the measured speed with the desired speed, and adjusting the current applied to the motor windings accordingly.

Notably, while rotor rotation requires sequential pulsing, mapping the initial position of the rotor may be achieved with either a sequential or an arbitrary order of pulsing in accordance with the present invention.

Other features of the present invention are disclosed or apparent in the section entitled: "BEST MODE FOR CARRYING OUT THE PRESENT INVENTION."

BRIEF DESCRIPTION OF THE DRAWINGS

For a fuller understanding of the present invention, reference is made to the accompanying drawings in the following detailed description of the Best Mode of Carrying Out the Present Invention. In the drawing.

Figure 1:
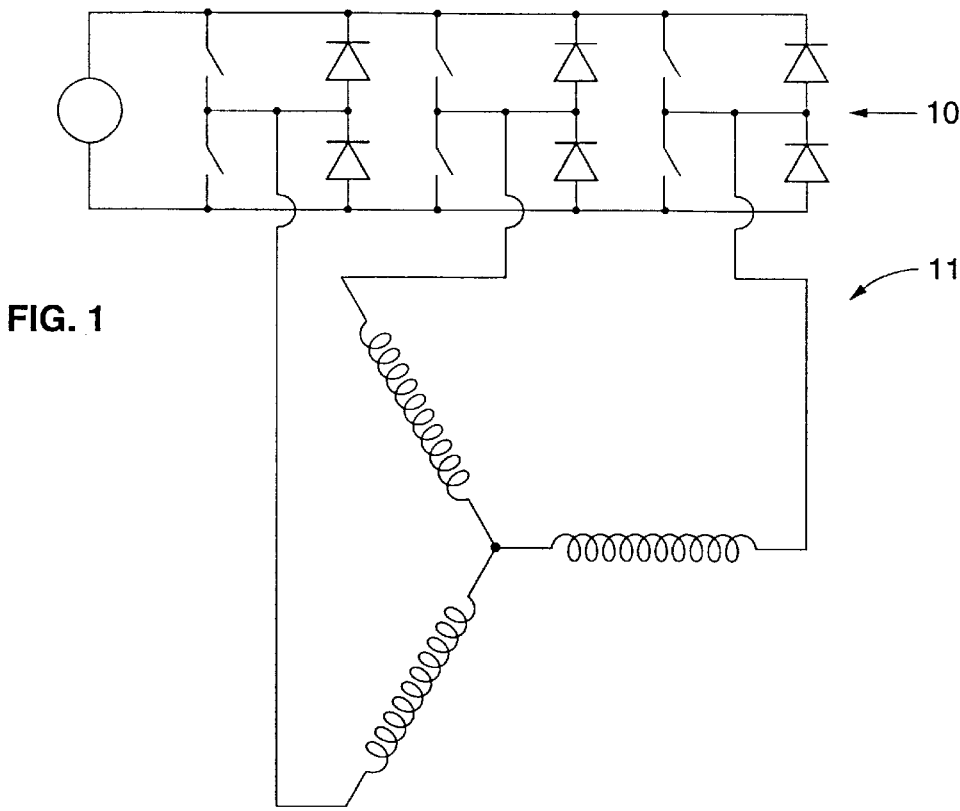
FIG. 1. is a schematic drawing of a typical drive system for a brushless DC motor.

Reference numbers refer to the same or equivalent parts of the present invention throughout the figures of the drawing.

BEST MODE FOR CARRYING OUT THE PRESENT INVENTION

Referring now to FIG. 1, there is illustrated a typical driver 10 for a brushless DC motor 11. By way of example, the present invention is useful in a motor such as that shown in U.S. Pat. No. No. 4,858,044. However, it should be understood that the principles of the present invention are applicable to any type of motor having an excitation flux created by a permanent magnet or by DC current excitation of a winding.

The function of the driver 10 is to apply current to the correct windings of the brushless DC motor 11, in the correct direction, at the correct time. This process is called commutation, since it corresponds to the action performed by the commutator and brushes in a brush-type DC motor. In the driver 10, semiconductor switching elements such as transistors, thyristors, or the like, are sequentially turned on and off to continuously generate torque in the brushless DC motor 11. Such drivers are well known in the art, and in order to avoid confusion while enabling those skilled in the art to practice the invention, details related to the driver 10 are omitted in this specification.

The driver 10 requires position information from the brushless DC motor 11 for the commutation points (four points per electrical period). In conventional systems, the position information may be obtained from Hall-effect sensors, for example. When the motor 11 is running, back emf (electromotive force) zero crossing points which correspond to the commutation points can be detected. If the position of the rotor at rest is not known, the motor 11 may start in the wrong direction when power is first applied. This may not matter for many applications, but in applications such as driving the spindle motor in a disk drive, starting in the incorrect direction is not acceptable.

Figure 2:
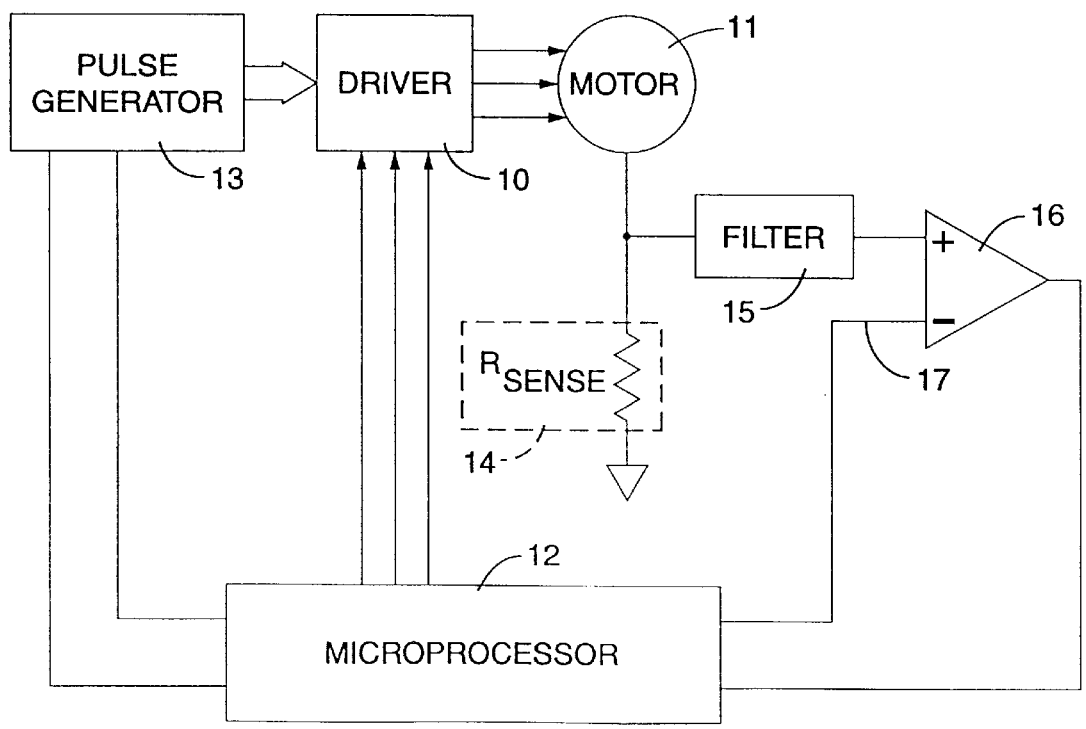
FIG. 2 is a schematic drawing illustrating a position detection system disclosed in U.S. Pat. No. 5,028,852.

FIG. 2 illustrates generally the operation of the position detection system that is taught in U.S. Pat. No. 5,028,852 and in U.S. Pat. No. 5,254,914. The position detection system of FIG. 2 comprises a circuit controlled by a microprocessor 12. A pulse generator 13 injects (by way of the driver 10) short current pulses in different phases of the motor 11, each phase or pair of phases being energized first by a pulse of one polarity, and then by a pulse of the opposite polarity. The excitation current is converted to a voltage as it passes through a sense resistor 14. The voltage is filtered to remove noise by a filter 15. The voltage is applied to a comparator 16 which has a reference voltage applied at another terminal 17. The current is supplied to each phase of the motor 11 until the voltage across the sense resistor 14 becomes larger than the reference voltage applied at terminal 17 of the comparator 16.

The time required for the injected current in each phase to reach a predetermined magnitude is measured.

The sign and magnitude of the time difference between the rise times of the two pulses injected into the same phase or pair of phases is then detected. Based on the determination of the sign of the time difference, the direction of the excitation flux, and consequently, the motor position at standstill is thus determined.

By performing a succession of these tests on different phases or pairs of phases of the standing motor, a table of the sign of the differences is established which clearly defines the position of the rotor relative to the motor phases. The same table then defines what polarity currents should be applied to each phase to reliably and certainly start the motor in the proper direction. See Table I, below.

TABLE I

| Rotor Position in Electrical Degrees | Sign of $\Delta t1$ | $\Delta t2$ | $\Delta t3$ | Phase Excitation 01 | 02 | 03 |
|---|---|---|---|---|---|---|
| 0 + 30 | 0 | 1 | 0 | 1 | 0 | 0 |
| 60 + 30 | 0 | 1 | 1 | 1 | 1 | 0 |
| 120 + 30 | 0 | 0 | 1 | 0 | 1 | 0 |
| 180 + 30 | 1 | 0 | 1 | 0 | 1 | 1 |
| 240 + 30 | 1 | 0 | 0 | 0 | 0 | 1 |
| 300 + 30 | 1 | 1 | 0 | 1 | 0 | 1 |

There are rotor positions in which the sign of the difference is negligible or not determinable, or in which the magnitude of the rise times or the difference between them is small and corrupted by noise. Then the "sign" is simply not known at all positions. In fact, U.S. Pat. No. 5,028,852 describes an adaptive technique to drive the saturation levels higher until a sign is determined. U.S. Pat. No. 5,254,914 similarly indicates that if the magnitude of the time difference for any one of the phases indicates that the position may be erroneous, the state selection process will be inhibited and the position detection process will be repeated using a different reference level. U.S. Pat. No. 5,028,852 and 5,254,914 are incorporated herewith by reference as if fully set forth herein. Moreover, the system disclosed may not determine the correct sign if the signal is small and susceptible to noise corruption. If a variable reference source is used, the threshold level may be raised to create a larger time difference and increase the confidence in the measurement. However, the addition of a magnitude analyzer and variable threshold circuitry increases the complexity of the system.

The present invention provides new solutions for determining rotor position when the sign of the difference in rise times is ambiguous, or in which the magnitude of the rise times is negligible or so corrupted by noise as to be ambiguous, where the present invention does not necessitate the need to vary threshold of an induced voltage level in order to resolve ambiguities.

Figure 3:
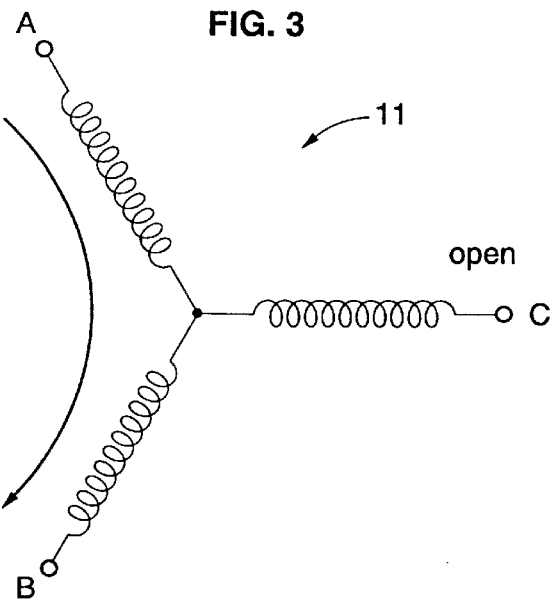
FIG. 3 is a schematic representation of the phases of the motor of FIGS. 1 and 2, illustrating a test current flowing through phases A and B, while phase C is open circuited.

Referring now to FIG. 3, taken in conjunction with FIGS. 1 and 2 and the conventional measurement as described in U.S. Pat. No. 5,028,852 and in U.S. Pat. No. 5,254,914, short duration current pulses are applied to motor 11 while at rest by driver 10. The current pulses are long enough to provide accurate measurement, but short enough so that the rotor remains at rest. Moreover, in the present invention, the positive and negative pulses are approximately equal in magnitude and duration and applied so close in time to the same phase or combination of phases that they effectively cancel each other. Since effectively no net energy is applied to the phases, no torque is developed and the rotor does not rotate.

As shown in FIG. 3, phase A and phase B are conducting. The comparator 16 is tripped, and the elapsed time and current magnitude written to memory. The current is set to zero. The polarity is reversed and the current is again increased until the comparator 16 is tripped again. The elapsed time and current magnitude is again written to memory. The other combinations, phase A and phase C, and phase B and phase C, are then measured in the same manner for a total of six readings. It should be noted that the sequence of pulses applied to the windings is arbitrary, there being no particular sequence required according to the principles of the present invention.

Based upon the differences in readings, the state of the motor 11 is known as far as rotor position is concerned. Accordingly, a starting combination of currents to start the motor in a positive direction is determined. (See Table I). For example, if $\Delta t1$ is negative (or a binary zero), $\Delta t2$ is positive (or a binary one), and $\Delta t3$ is positive (or a binary one), then the rotor position in electrical degrees is 60±30 degrees. However, there are positions in which the difference is zero or negligible.

In accordance with the principles of the present invention, when there are ambiguities in the sign of the difference, the rotor position may be determined by using the magnitude of the (inductance) time if the difference in rise time is small. Some rotor positions have a "large time" associated with them, and some positions have a "small time" associated with them. With a combined knowledge of the rise time difference too small and the magnitude of the time, it is possible to identify the rotor position, and hence, the correct starting phase combination.

The location of small difference in rise time, i.e., $\Delta t3<X$ is accompanied by a large magnitude (i.e., unsaturated inductance) time to threshold. Therefore, if $\Delta tn<X$, then check that tn+ or tn− has a large value>Y. If these conditions are met, then the location is at a particular position (i.e., 30 degrees electrical) has been confirmed, rather than an anomaly or noise condition, and the optimum phase condition can be commanded, i.e., "110". Therefore, the combination of the sign of the rise time difference or its absence plus the magnitude of the rise time can be used to further qualify the position to determine the position and the appropriate phase condition for starting. The use of the magnitude of the sign difference plus magnitude of the rise time can also be used to quantify position within several degrees. Thus, optimum starting initial position phase or command, plus subsequent "open" loop timing phase advances are possible until zero back emf crossings are reliably detected. Accordingly, where T is the rise time, the magnitude of T (inductance) and $\Delta T$ (inductance) difference are used in combination with a look up table to qualify an uncertain or ambiguous rotor position. As positive and negative polarity pulsing will result in one or more positive and negative rise time pairs, it should be understood that it is preferable to use the larger magnitude, if one exists (e.g., for /tn+/≠/tn−/ and both greater than Y, use the larger of the two magnitudes), to resolve ambiguity.

There is another way to quantify position to resolve a position uncertainty by changing the effective rotor position. Ordinarily, when the pulse is applied to the phases of the motor, as shown at C in FIG. 3, one of the phases is open, or not connected, while two phases (A and B) are conducting. It is a feature of the present invention that if the third phase is tied high or tied low during the application of the pulse, the effective position of the equivalent phase is shifted so that what was originally a "null inductance difference" is changed.

Figure 4:
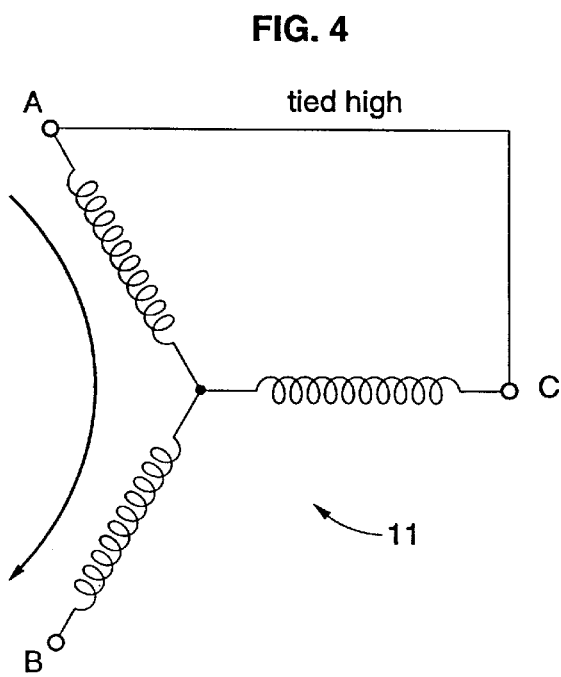
FIG. 4 is a schematic representation of the phases of the motor of FIGS. 1 and 2, illustrating a test current flowing through phases A and B, while phase C is tied high.
Figure 5:
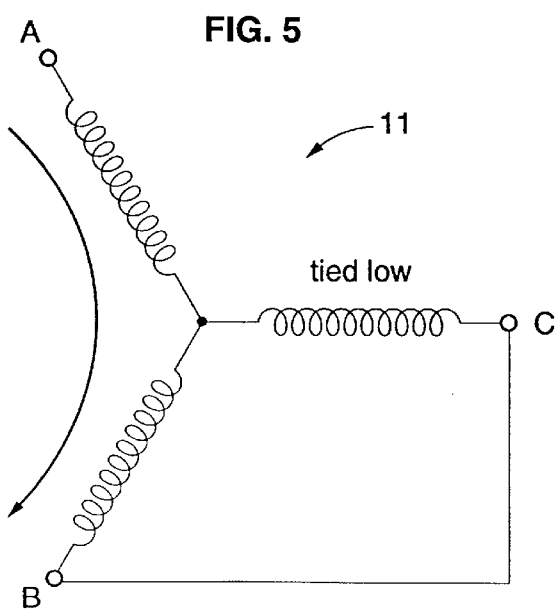
FIG. 5 is a schematic representation of the phases of the motor of FIGS. 1 and 2, illustrating a test current flowing through phases A and B, while phase C is tied low.
Figure 6:
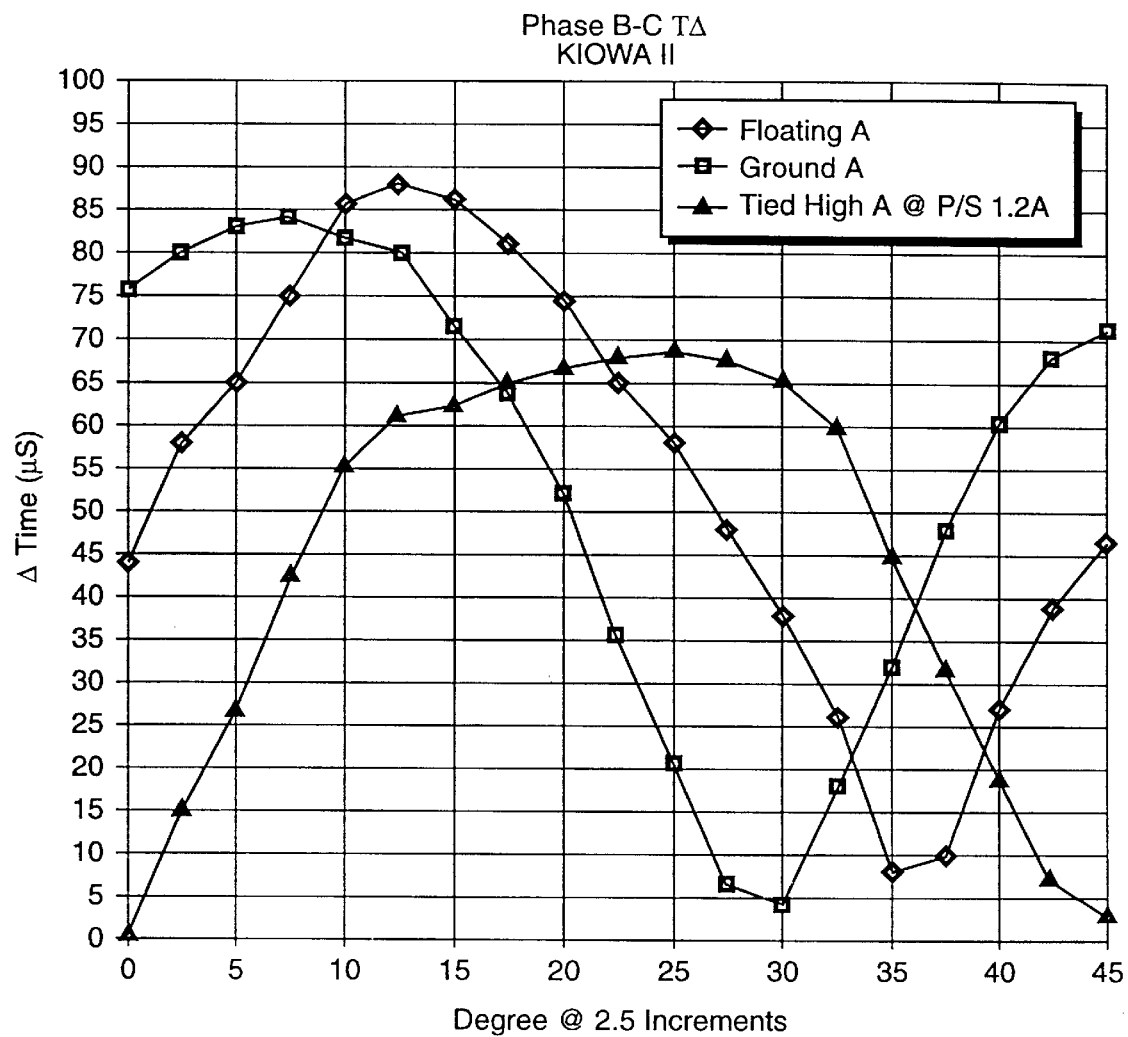
FIG. 6 is a graph of the phase B-C rise time difference with phase A open (floating), with phase A tied high, and with phase A tied low (ground).

Referring now to FIG. 4, the third or C winding is shown tied high. FIG. 5 shows the third or C winding tied low. FIGS. 6 through 13 show graphs having motor electrical angle in degrees along the abscissa, and time or time difference in microseconds along the ordinate. These graphs were made from data measured on a Kiowa motor for various phases, and for third phase open, tied high, and tied low. These graphs illustrate that a null of $\Delta T$ is shifted by either tieing the third lead high or low. Accordingly, a look up table may be used in conjunction with known data from table I to decode the new electrical position if there is uncertainty about the start position.

In operation, the way in which the novel technique of the present invention works is as follows. If the magnitude of the difference of the time obtained with the positive polarity pulse and the time obtained with the negative polarity pulse is small, or less than a predetermined value, a test is first made with the third phase open. For a particular 8-pole motor, we have the following data: for phase B-C, it is seen from FIGS. 6 through 13 that the null occurs at about 37 degrees. Also, it is seen from FIGS. 6 through 13 that the magnitude of the inductance is high (i. e., unsaturated or low saturation condition). Now, if the phase A-B (phase C open) results are checked, it is seen that a positive rise time indicator much greater than a negative rise time indicator (+ve>>−ve) results, where +ve is greater than −ve by more than a threshold value of E). For this embodiment, E was set at 20 microseconds. Similarly, for exciting phase A-B (phase C open), the null position for a 8 pole motor is about 23 degrees where +ve >>−ve at 23 degrees (more than the same threshold value E).

For an 8-pole motor, the graphs of FIGS. 6 through 13 also show the shifting of the null by about 7.5 degrees by either tieing the third connection high or low. The shifting of the null illustrates how the ambiguity is eliminated. This can be done by pulsing all three phases actively. Instead of leaving a phase open during pulsing, it can either be tied high or tied low. When the third lead has been tied high or low, it has been found that, with a given motor, there is an approximate 7.5 degree electrical shift in the small rise time difference condition. Therefore, ambiguities in sign of difference $\Delta X$ can be resolved by retest with the extra lead tied either high or low. Mapping of the motor position in this way precisely defines the starting position to within several electrical degrees.

Figure 14:
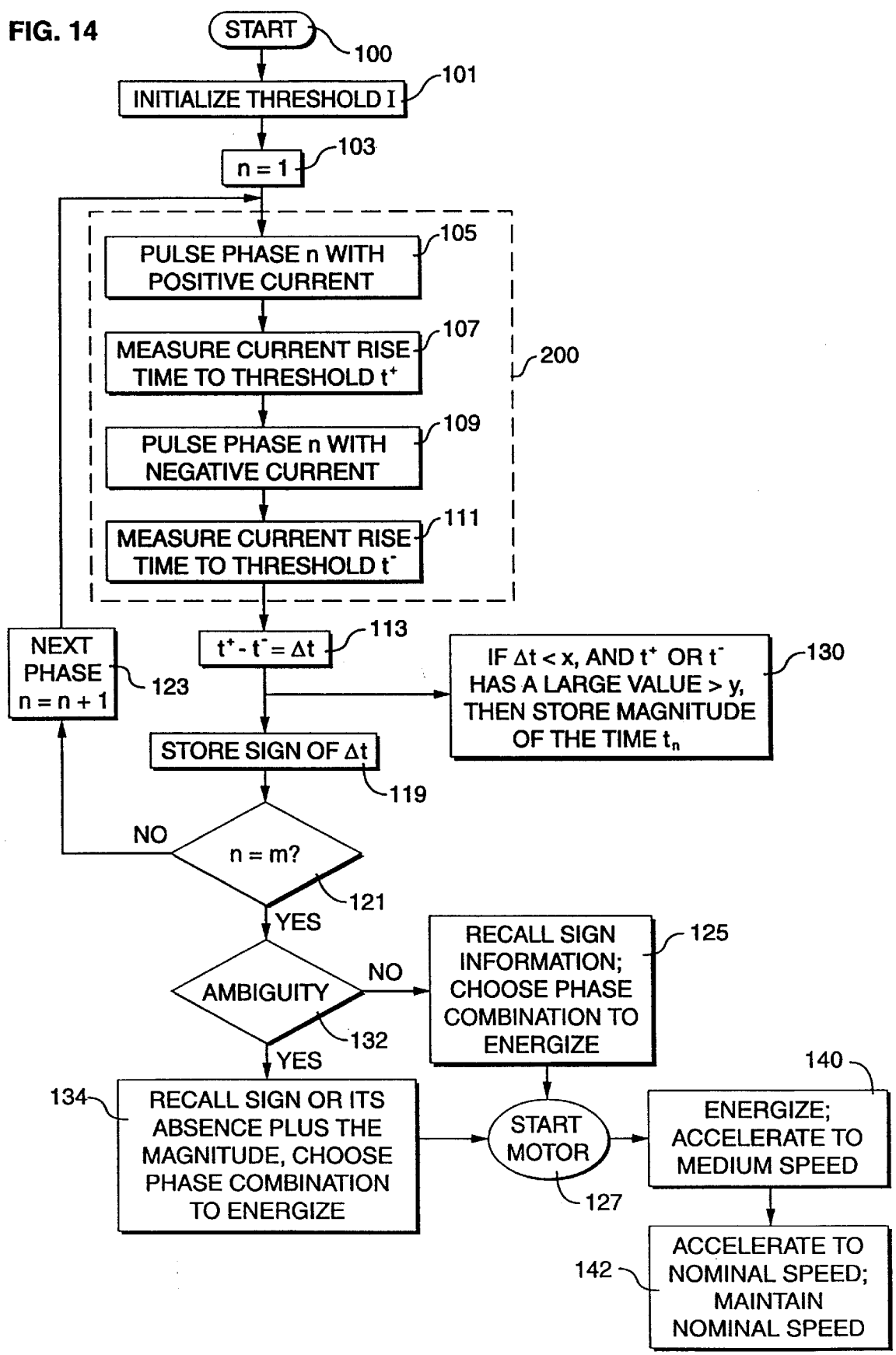
FIG. 14 is a flow chart summarizing the rotor position detection and start up process of the present invention for the version employing the magnitude of the sign difference plus the magnitude of the rise time.
Figure 15:
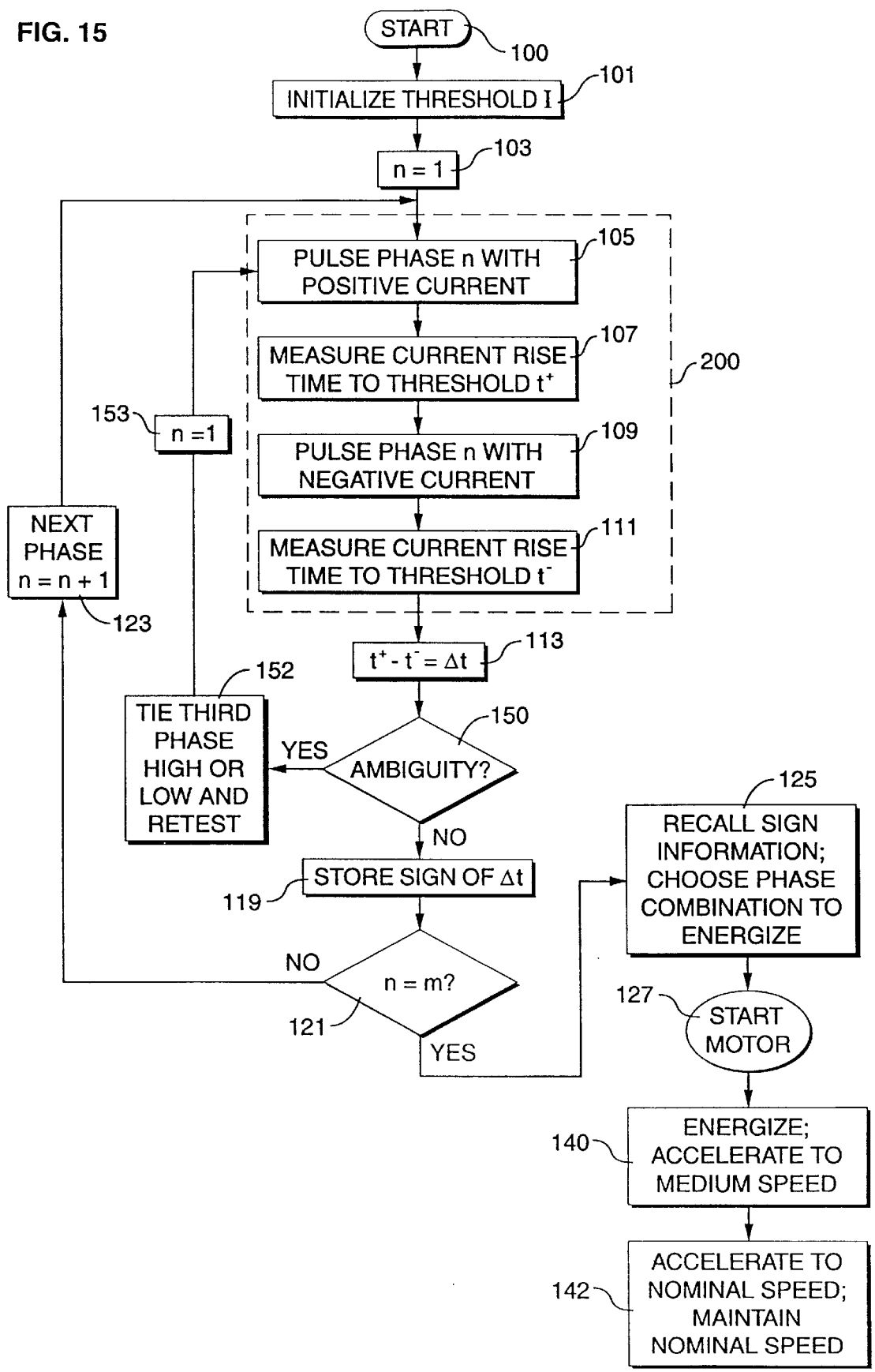
FIG. 15 is a flow chart summarizing the rotor position detection and start up process of the present invention for the version employing the shifting of the effective rotor position by tieing the third phase high or low.

Referring now to FIGS. 14 and 15, there are shown flow charts summarizing the rotor position detection and start-up process of the present invention. Referring now to FIG. 14, the motor 11 is at a standstill at start 100 in the flow chart. Both the threshold level I and the phase counter are initialized at blocks 101 and 103. Phase n (or a combination of phases n) is driven with a short positive current pulse at block 105. The time duration for the pulse to rise from zero to the threshold level I is measured in block 107 as t+. The same phase is then pulsed with a short negative current pulse in block 109 and the rise time is again measured in block 111 as t−. In block 113, the magnitude of the rise time of the negative pulse t+ is subtracted from the magnitude of the rise time of the positive pulse t+. The result is $\Delta t$, the time difference between the rise times.

The sign of $\Delta t$ is stored in memory at step 119. At step 121, it is determined if all of the phases m have been tested. If not, the phase number is incremented by one in step 123, and the process repeats at step 105 by pulsing the next phase. If all of the phases have been tested, i.e., if n equals m, then the stored values of the sign of the time differences are accessed and used to determine the position of the rotor at step 125 if there is no ambiguity at step 132. A look up table, as previously described, is used to determine which phases must be energized to accurately start the motor in the correct direction. The motor is started in step 127.

In accordance with the present invention, if there is ambiguity in the sign of the time difference, that is, if the time difference is zero or negligible, then the rotor position may be determined by using the magnitude of the time. Referring again to FIG. 14, block 130 indicates that if $\Delta t$ is smaller than X, and t+ or t− has a large value>Y, then the magnitude of the time tn is stored. Typically X and Y are set at values each representing approximately 20% of the lower range of possible values. At step 132, if there is an ambiguity, then at block 134, the process recalls the sign or its absence plus the magnitude of the time, and chooses the phase combination to energize the motor. The motor is started in step 127.

In accordance with another feature of the present invention, if there is ambiguity in the sign of the time difference, that is, if the time difference is zero or negligible, then the effective electrical position may be changed by approximately 7.5 degrees, for example, by tieing the usually open phase either high or low.

Referring now to FIG. 15, block 150 indicates that if there is an ambiguity in Δt, then as shown in block 152, the third phase is tied high or tied low, and the phases are retested (i.e., n set equal to one again at step 153). When the third lead is tied high or low, there is an approximate 7.5 degree electrical shift in the small rise time difference condition. Mapping of the motor position in this way precisely defines the starting position to within several electrical degrees. Therefore, ambiguities in the sign of the difference in the rise times can be resolved by retest with the extra lead tied either high or low. Notably, if there is not an ambiguity at step 150, the process goes directly to step 119.

Referring to FIGS. 14 and 15 in combination, while it is shown that positive (step 105) then negative (step 109) current is applied and then respectively measuring rise time (steps 107 and 111), it should be understood that the order may be reversed. In other words, negative then positive current may be applied. Moreover, all phases may be first pulsed with one polarity, and then all phases may again be pulsed but this time with an opposite polarity. Therefore, in the generalized case, step 200 indicates that all n phases are pulsed in any order with positive and negative polarity current, where each application of current is measured for rise time to a predetermined threshold.

It should be understood that the present invention may be employed to determine the duration of pulse needed to be applied prior to switching polarity. As the present invention may be used to precisely locate rotor position, distance from first commutation location will also be known. Thus, the polarity and the duration of a first pulse for starting the motor and moving the rotor up to a first commutation location may be determined in accordance with the present invention. While this has been explained in terms of a first commutation location, it will be appreciated by those of ordinary skill in the art that pulse polarity and duration may be determined for each first commutation location corresponding to each phase of a motor.

In the present invention, virtually all ambiguity regarding rotor position is accurately and reliably resolved. While unlikely, it is possible to still have an ambiguity after using the sign of the rise time difference and a magnitude of one of the rise times. If so, such ambiguity may be further resolved by tying high or low.

Once rotor starting position is reliably and accurately determined, the motor is then ready to be started and accelerated to medium speed. Referring to FIGS. 14 and 15, step 140 corresponds to driving the motor 11 from stand-still to medium speed without the use of known rotor position detectors such as Hall Effect devices as described in "Closed-Loop Control of A Brushless D.C. Motor From A Standstill To Medium Speed", U.S. Pat. No. 5,117,165 which is incorporated by reference as if fully set forth herein. The system described therein is intended to be exemplary of such a system and forms a part of the present invention. As described, a select combination of motor phases are supplied with long duration current pulses based upon the rotor position. These pulses are applied for a predetermined duration in order to produce a sustained torque. Ideally, the sustained torque rotates the rotor to a new position.

Figure 7:
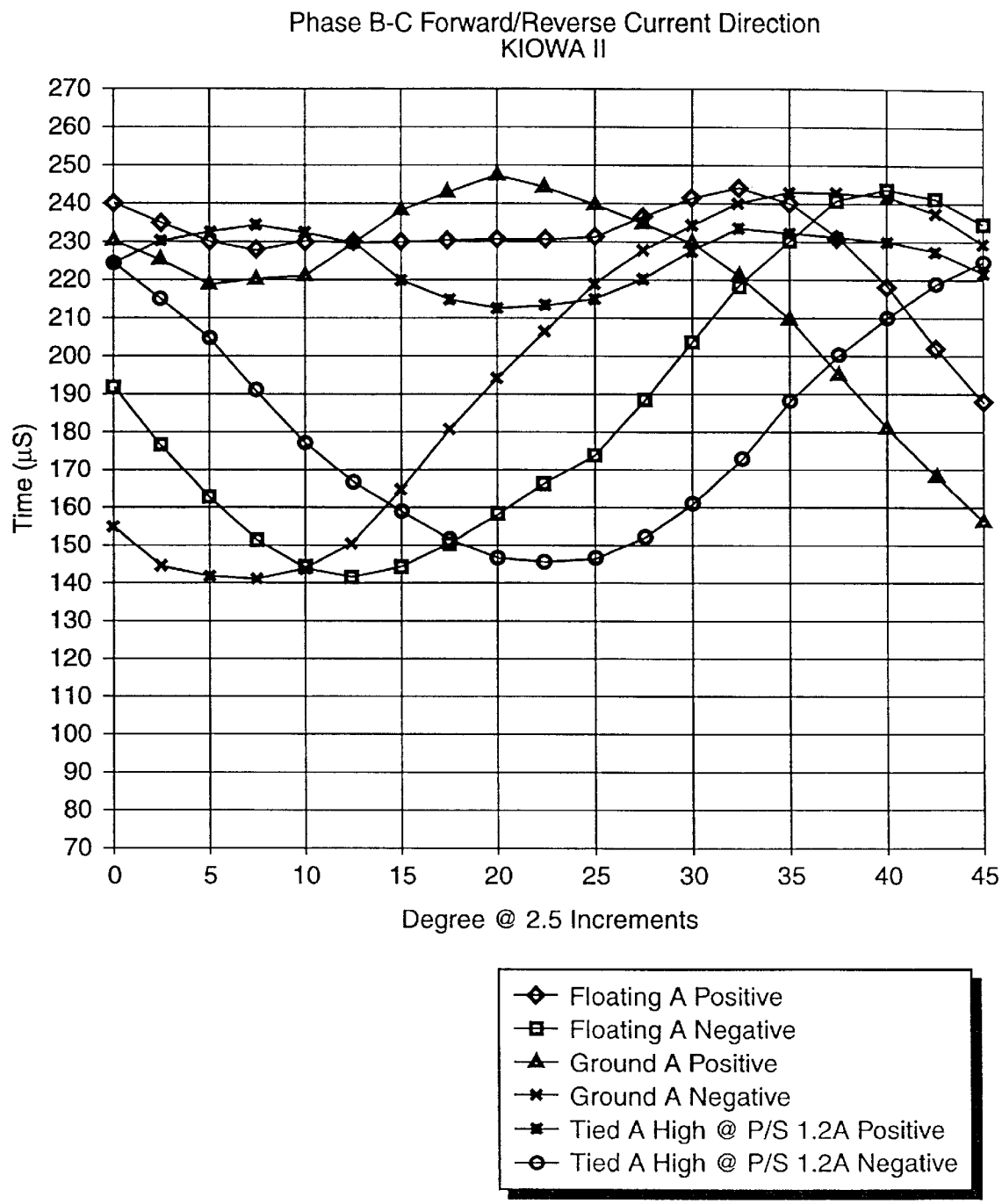
FIG. 7 is a graph of the phase B-C rise time for positive current direction and for negative current direction, with phase A open, tied high, and tied low.
Figure 8:
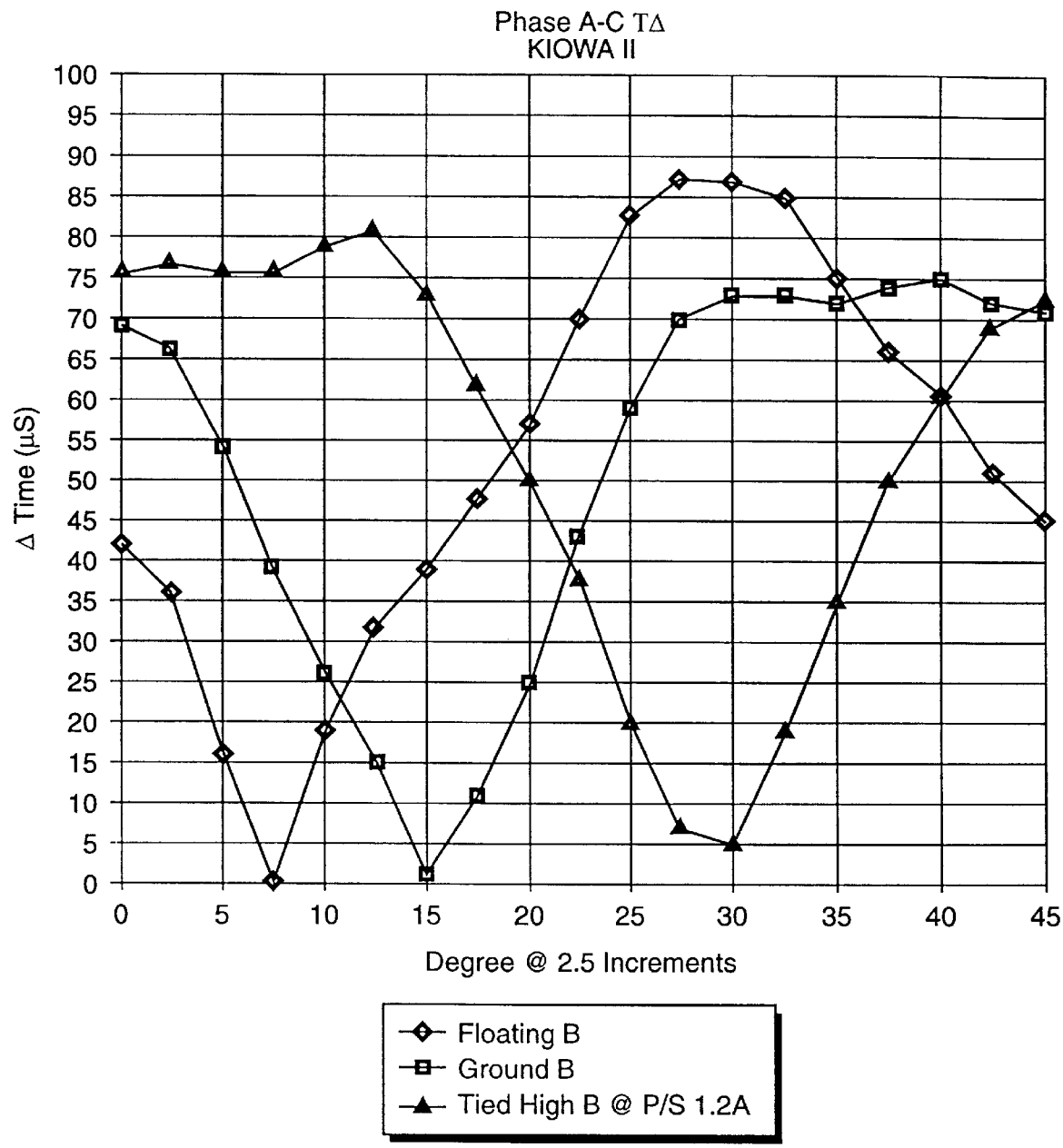
FIG. 8 is a graph of the phase A-C rise time difference with phase B open (floating), with phase B tied high, and with phase B tied low (ground).
Figure 9:
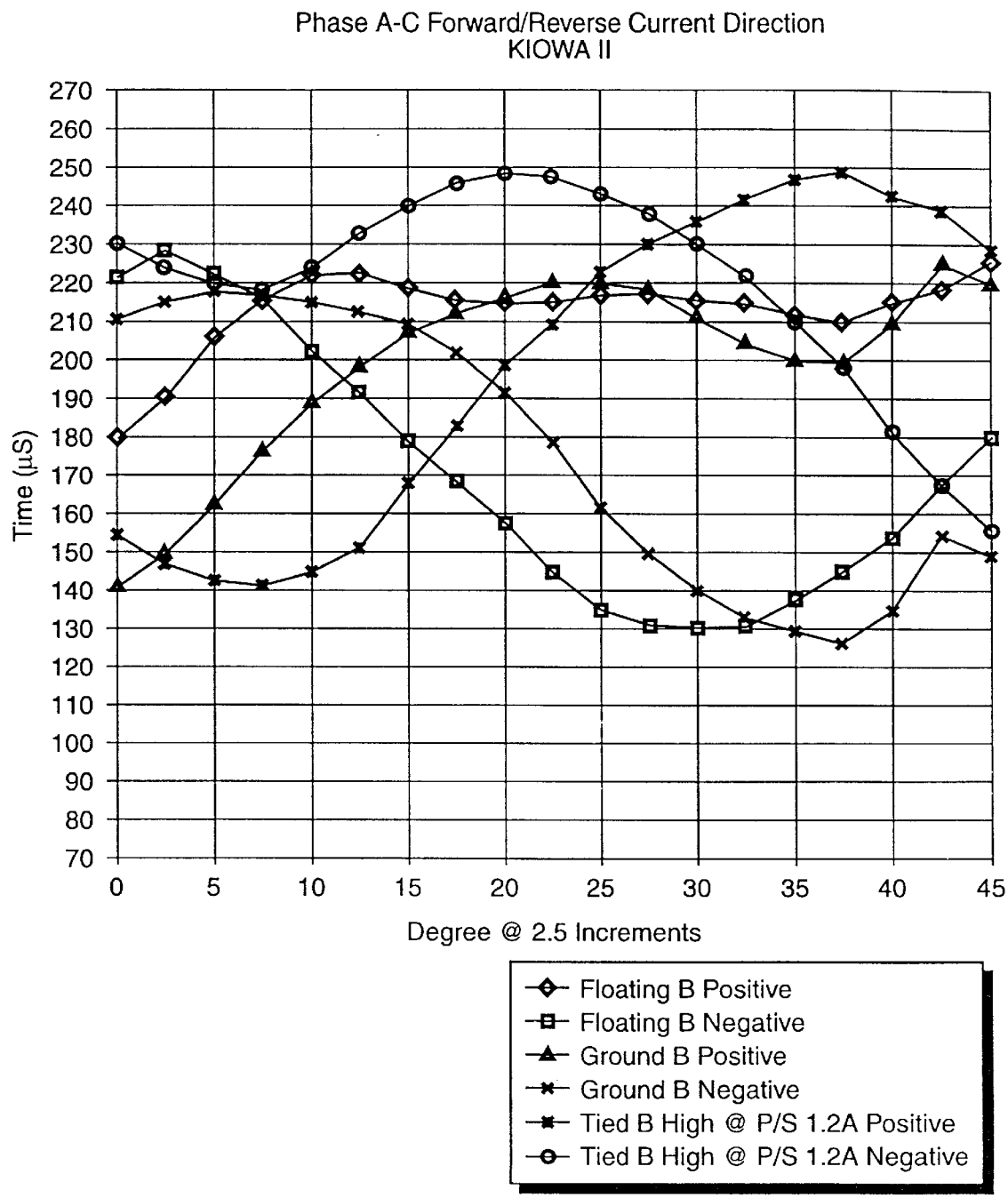
FIG. 9 is a graph of the phase A-C rise time for positive current direction and for negative current direction, with phase B open, tied high, and tied low.
Figure 10:
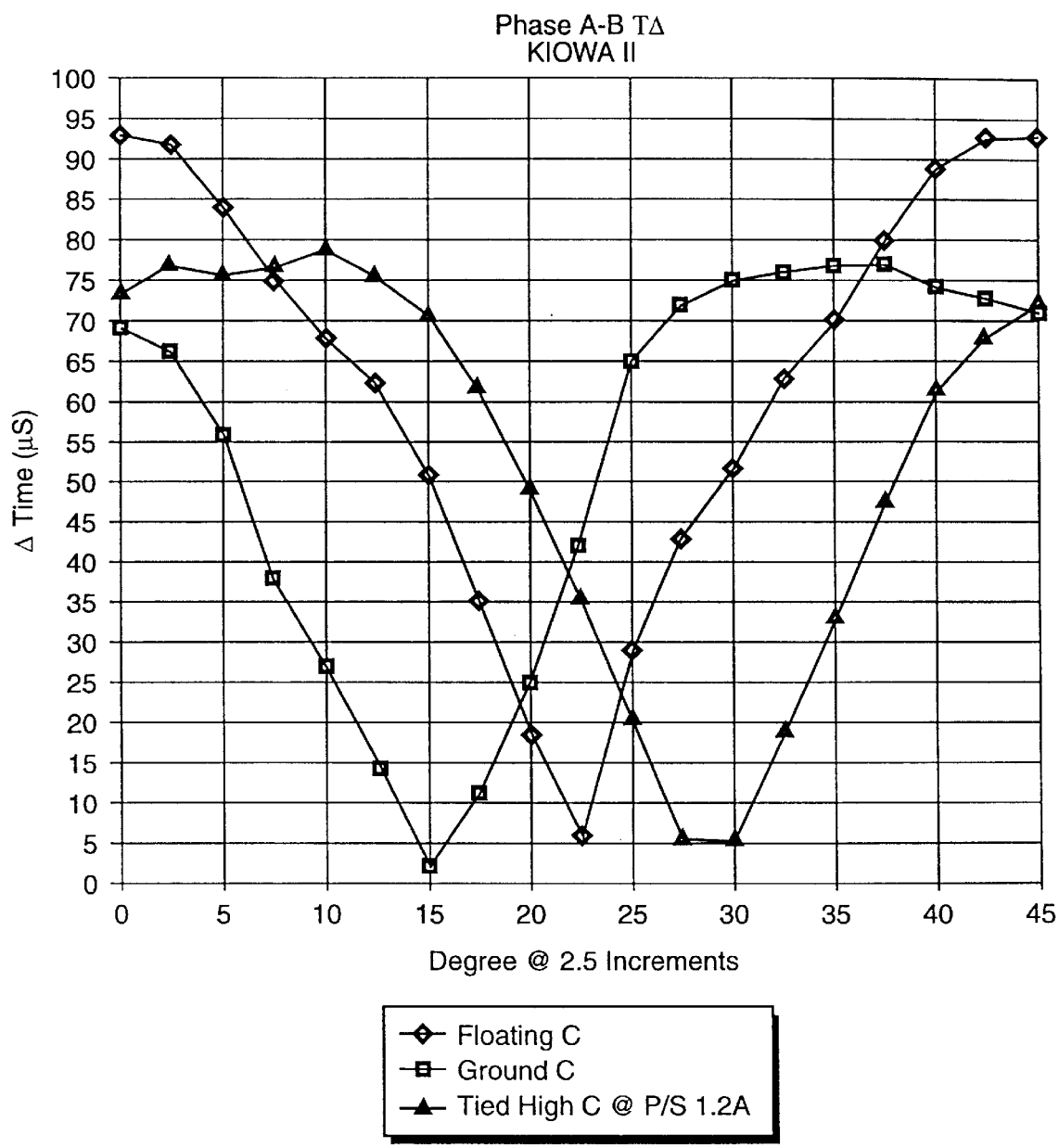
FIG. 10 is a graph of the phase A-B rise time difference with phase C open (floating), with phase C tied high, and with phase C tied low (ground).
Figure 11:
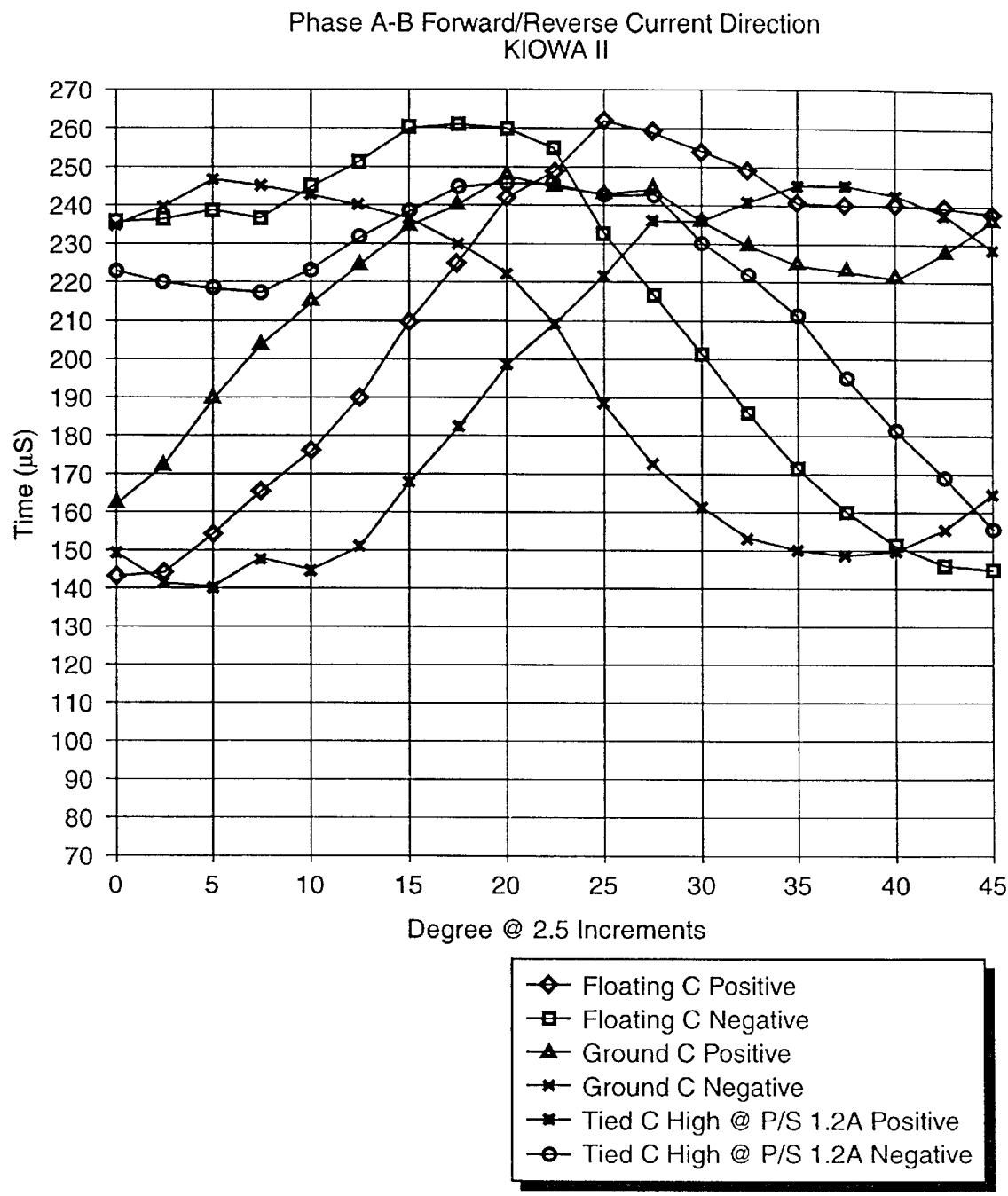
FIG. 11 is a graph of the phase A-B rise time for positive current direction and for negative current direction, with phase C open, tied high, and tied low.
Figure 12:
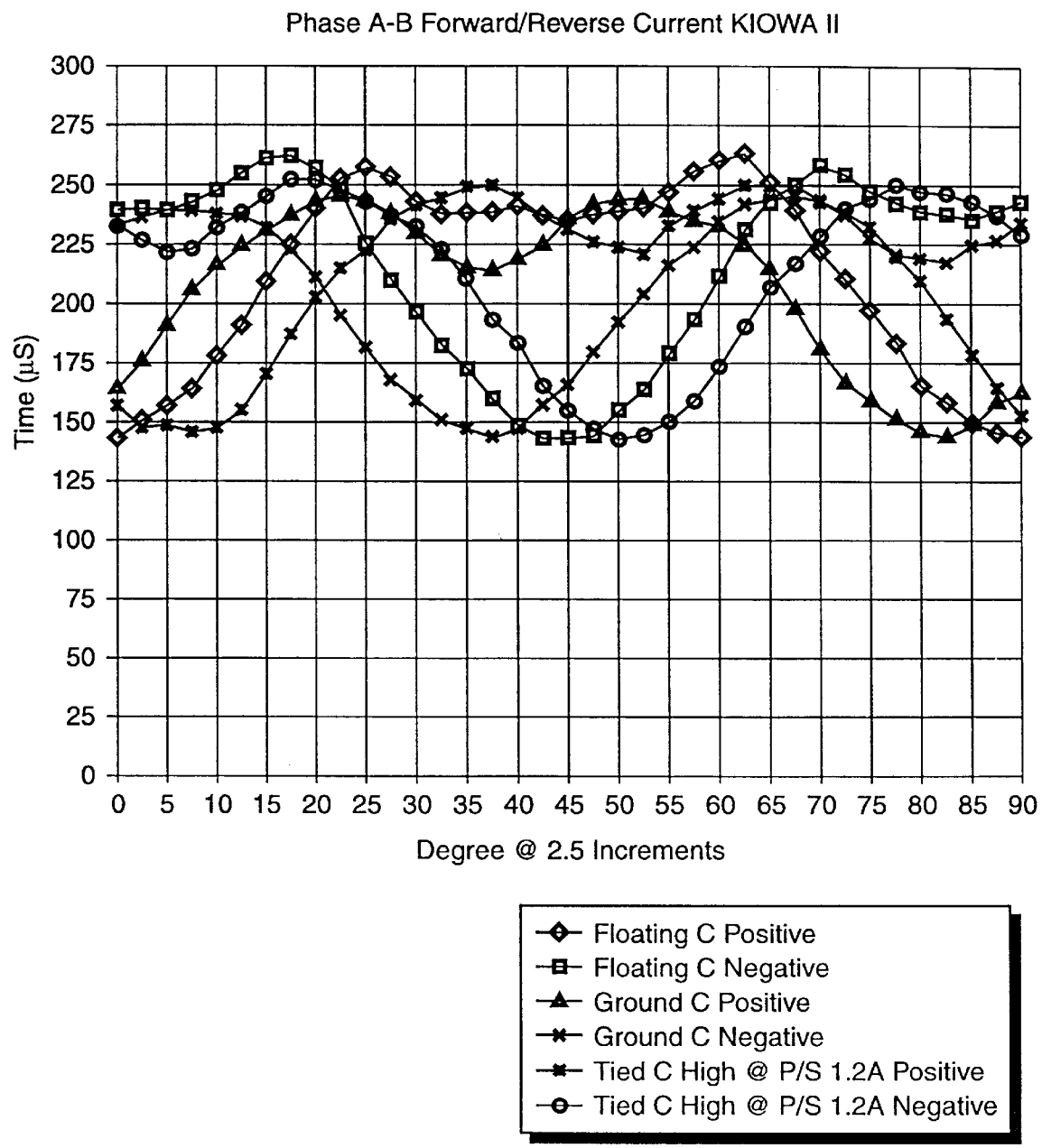
FIG. 12 is similar to FIG. 11, except that FIG. 12 is plotted from zero to ninety degrees.
Figure 13:
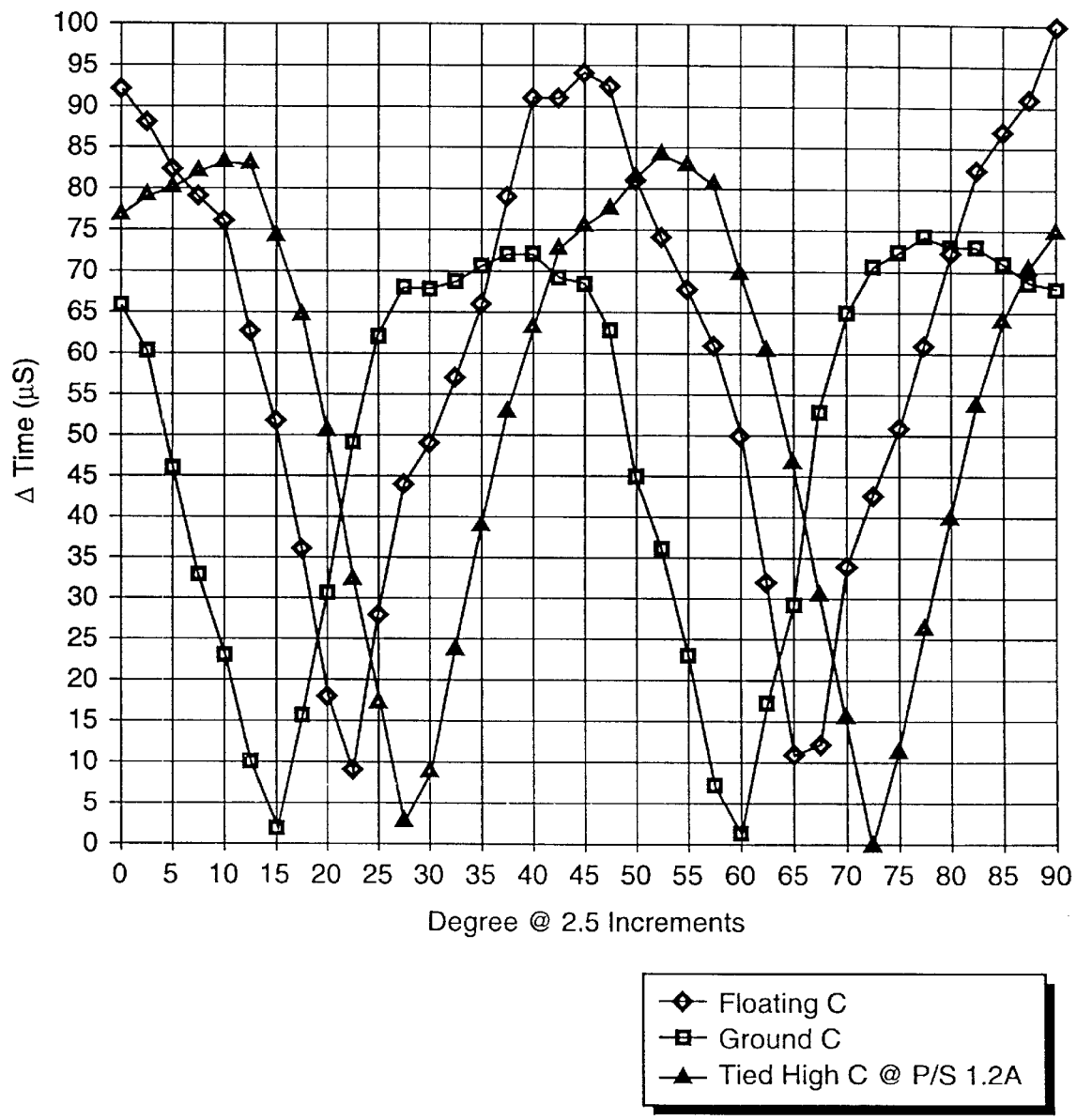
FIG. 13 is similar to FIG. 10, except that FIG. 13 is plotted from zero to ninety degrees.

The system shown in FIGS. 7 and 8 of the referenced patent determines if the motor has been accelerated via repetition of the position detection method. From the position information, a select combination of phases may be energized with long duration current pulses to further accelerate the rotor. The duration of the energizing pulses is reduced by a fixed amount after each sequence of rotor position location and acceleration current application. In controlling the acceleration, the system determines the duration during which torque producing currents in a given combination are applied to the motor phases. If the position detection system responds with a position which is the same as the previous determination, the duration of the applied torque producing current pulse is not decremented. This process of rotor position detection and corresponding current application for an adaptive time period is sequentially repeated until the motor has reached a medium speed.

However, in some cases of high motor friction, it is possible that the motor will not reach medium speed. As a security feature, a counter will count the number of sequences effectuated. If the counter reaches a predetermined value, the back emf acceleration control system is activated in an attempt to synchronize on the back emf signal even though its amplitude will be very small due to the motor's slow speed.

The major advantage of this approach is that no outside device is necessary to measure the speed. A completely sensorless approach is used. Furthermore, in the case of large motor friction which is dependent speed (for example, the friction due to the read/write heads on a hard disc), the present invention will adapt to the friction variation.

FIGS. 6A and 6B of the referenced patent depict, in flow chart form, the complete algorithm of the systems of FIGS. 7 and 8 thereof, which can be easily implemented in a microprocessor.

After the motor attains medium speed, it is accelerated to and maintained at nominal speed. With continuing reference to FIGS. 14 and 15, step 142 corresponds to controlling the speed of a brushless DC motor as described in "Closed Loop Control Of A Brushless DC Motor At Nominal Speed," U.S. Pat. No. 5,245,256, which is incorporated by reference as if fully set forth herein. Here, the speed of the motor is determined using the back emf zero-crossings, measured only on complete rotor revolutions without the use of conventional rotor position location devices is described. The desired speed is monitored by comparing the measured speed with the desired speed, and adjusting motor current accordingly. A block diagram of a highly accurate control system for accelerating a brushless DC motor from medium speed to nominal speed and then maintain a constant nominal speed is provided in FIG. 3 of the referenced patent. FIGS. 7A to 7H of the referenced patent comprise a detailed flow diagram of the operation of the control system of FIG. 3 thereof. The acceleration and nominal speed control system described therein is intended to be exemplary of such a system and forms a part of the present invention.

The present invention has been particularly shown and described with respect to a preferred embodiment and features thereof. However, it should be readily apparent to those of ordinary skill in the art that various changes and modifications in form and detail may be made without departing from the spirit and scope of the invention as set forth in the appended claims. In particular, the present invention is applicable to any brushless DC motor in which excitation flux is created by permanent magnet and by stator current excitation of a winding. The invention illustratively disclosed herein may be practiced without any element which is not specifically disclosed herein.

What is claimed is:

1. In a brushless DC motor having n phases corresponding to phase windings arranged as a stator and a rotor for n an integer greater than zero, a method for starting the motor in a predetermined direction of rotation of the rotor, the method comprising the steps of:

initializing a threshold induced voltage level;
   mapping electrical position of the rotor including the steps of:
      pulsing a phase of the n phases with positive current to provide positively induced voltage without appreciably altering the electrical position of the rotor and to provide a positively pulsed phase;
      measuring a first rise time for the positively induced voltage for the positively pulsed phase to reach the threshold induced voltage level;
      again pulsing the phase of the n phases but this time with negative current to provide negatively induced voltage without appreciably altering the electrical position of the rotor and to provide a negatively pulsed phase;
      measuring a second rise time for the negatively induced voltage for the negatively pulsed phase to reach the threshold induced voltage level;
      determining a difference between the first and the second rise time as measured in each of the measuring steps;
      determining and storing any sign of the difference;
      determining if the difference is too small to resolve the electrical position of the rotor;
      determining and storing, if the difference is too small to resolve the electrical position of the rotor, a magnitude of one of the first and the second rise time associated with the difference; and
      repeating the steps comprising the step of mapping until each of the n phases is processed;
   determining, based on the difference for each of the n phases, whether the electrical position of the rotor is ambiguous; and
   recalling and comparing the sign of the difference plus the magnitude of an associated one of the first and the second rise time, if the electrical position is ambiguous, with predetermined stored motor electrical position information to energize at least one of the n phases to start the motor in the predetermined direction of rotation.

2. The method of claim 1 further comprising the step of:
   accelerating the motor to revolve at a medium speed.

3. The method of claim 2 further comprising the steps of:
   accelerating the rotor from the medium speed to revolve at a nominal speed; and
   maintaining the rotor revolving at the nominal speed.

4. The method of claim 3 wherein n is equal to three.

5. In a brushless DC motor having n phases corresponding to phase windings arranged as a stator and a rotor for n an integer greater than zero, a method for determining an initial position of the rotor, the method comprising the steps of:

initializing a threshold induced voltage level;
   mapping electrical position of the rotor including the steps of:
      pulsing each phase of the n phases with a first polarity current to provide first polarity induced voltages without appreciably altering the electrical position of the rotor and to provide first polarity pulsed phases;
      measuring a first set of rise times for each of the first polarity induced voltages for a one-to-one correspondence with each of the first polarity pulsed phases to reach the threshold induced voltage level;
      pulsing each said phase of the n phases with a second polarity current to provide second polarity induced voltages without appreciably altering electrical position of the rotor and to provide second polarity pulsed phases;
      measuring a second set of rise times for each of the second polarity induced voltages for a one-to-one correspondence with each of the second polarity pulsed phases to reach the threshold induced voltage level;
      determining a set of differences between the first set and the second set of rise times as measured in each of the measuring steps;
      determining and storing any signs of all differences in the set of differences;
      determining which if any said differences are too small to resolve the electrical position of the rotor;
      determining and storing, for each of the differences which is too small to resolve the electrical position of the rotor, a magnitude of related rise time in one of the first set and the second set of rise times; and
      determining, based on each of the differences for each of the n phases, whether the electrical position of the rotor is ambiguous; and
   recalling and comparing each of the signs of each of the differences plus each said magnitude, if the electrical position is ambiguous, with predetermined stored motor electrical position information to determine the initial position of the rotor.

6. The method of claim 5 further comprising the step of:
   determining a duration and a polarity of at least one pulse for starting the motor in the predetermined direction of rotation, the duration of said pulse sufficient for moving the rotor up to but not passed an initially encountered commutation region.

7. The method of claim 6 further comprising the step of:
   accelerating the motor to revolve at a medium speed.

8. The method of claim 7 further comprising the steps of:
   accelerating the rotor from the medium speed to revolve at a nominal speed; and
   maintaining the rotor revolving at the nominal speed.

9. The method of claim 8 wherein n is equal to three.

10. The method of claim 8 wherein the first polarity current is negative polarity direct current, and the second polarity current is positive polarity direct current.

11. The method of claim 8 wherein the first polarity current is positive polarity direct current and the second polarity current is negative polarity direct current.

12. In a brushless DC motor having multiple phase windings and having a rotor, a method of determining rotor position by measuring rise times of the windings when sign polarity of the difference in rise times is ambiguous, or in which the magnitude of the rise times is negligible or so corrupted by noise as to be ambiguous, said method comprising:

selectively establishing current paths through at least one selected windings of the phase windings in response to control signals and for successively applying short duration current pulses of opposite polarities to each said selected phase winding to provide at least one energized winding;

detecting each voltage produced by the energized winding in response to each of said applied current pulses of opposite polarities;

determining and storing a magnitude for each rise time of each of said responses to said current pulses from zero amplitude to a fixed reference level;

subtracting each rise time of each of said responses to said current pulses one from the other to provide at least one rise time difference;

determining and storing at least one magnitude of said rise time;

determining whether each rise time difference is positive, negative or zero;

determining a starting combination of currents to start the motor in a predetermined desired direction by use of a table based upon sign polarity of said rise time differences for different ones of said phase windings, when said rise time difference is not zero or negligible;

determining, when said rise time difference is zero or negligible, a starting combination of currents to start the motor in said predetermined desired direction by use of a table based upon the combination of the sign polarity of the rise time difference and the magnitude of the rise time of the responses to said pulses applied to said selected winding, some rotor positions having a large rise time associated with them, and some rotor positions having a small rise time associated with them.

13. In a brushless DC motor having phase windings and a rotor, a method of determining rotor position, said method comprising:

selectively establishing current paths through at least one selected windings of the phase windings for successively applying short duration current pulses of opposite polarities to each said selected phase winding to provide at least one energized winding;

detecting each voltage produced by the energized winding in response to each of said applied current pulses of opposite polarities;

determining and storing a magnitude for each rise time of each of said responses to said current pulses from zero amplitude to a fixed reference level;

subtracting each rise time of each of said responses to said current pulses one from the other to provide at least one rise time difference;

determining and storing at least one magnitude of said rise time;

determining whether each rise time difference is positive, negative or zero;

determining a starting combination of currents to start the motor in a predetermined desired direction by use of a table based upon sign polarity of said rise time differences for different ones of said phase windings, when said rise time difference is not zero or negligible;

determining, when said rise time difference is zero or negligible, a starting combination of currents to start the motor in said predetermined desired direction by use of a table based upon the combination of the sign polarity of the rise time difference and the magnitude of the rise time of the responses to said pulses applied to said selected winding.

14. In a brushless DC motor having phase windings and a rotor, a method of determining rotor position, said method comprising:

selectively establishing current paths through at least one selected windings of the phase windings for successively applying short duration current pulses of opposite polarities to each said selected phase winding to provide at least one energized winding;

detecting each voltage produced by the energized winding in response to each of said applied current pulses of opposite polarities;

determining and storing a magnitude for each rise time of each of said responses to said current pulses from zero amplitude to a fixed reference level;

subtracting each rise time of each of said responses to said current pulses one from the other to provide at least one rise time difference;

determining and storing at least one magnitude of said rise time;

determining whether each rise time difference is positive, negative or zero;

determining, when said rise time difference is substantially zero, a starting combination of currents to start the motor in said predetermined desired direction by use of a table based upon the combination of the absence of sign polarity and substantially zero rise time difference for different ones of said phase windings and the magnitude of the rise time of the responses to said pulses applied to said selected winding.

* * * * *